(12) United States Patent
Shobara et al.

(10) Patent No.: US 6,527,188 B1
(45) Date of Patent: Mar. 4, 2003

(54) FRAME KIT FOR PC CARD, PC CARD, AND METHOD OF MANUFACTURING PC CARD

(75) Inventors: Yoshitaka Shobara, Kanagawa (JP); Kiyoshi Washino, Kanagawa (JP); Akihiro Tochi, Kanagawa (JP)

(73) Assignee: J. S. T. Mfg. Co., LTD, Osaka (JP)

( * ) Notice: Subject to any disclaimer, the term of this patent is extended or adjusted under 35 U.S.C. 154(b) by 0 days.

(21) Appl. No.: 09/673,209

(22) PCT Filed: Apr. 12, 1999

(86) PCT No.: PCT/JP99/01950
§ 371 (c)(1),
(2), (4) Date: Oct. 13, 2000

(87) PCT Pub. No.: WO99/53437
PCT Pub. Date: Oct. 21, 1999

(30) Foreign Application Priority Data

Apr. 14, 1998 (JP) .......................................... 10-103212

(51) Int. Cl.[7] ................................................. G06K 7/10
(52) U.S. Cl. ..................... 235/486; 235/492; 361/737; 439/76.1
(58) Field of Search ................................ 235/486, 492; 361/737; 439/76.1

(56) References Cited

U.S. PATENT DOCUMENTS

| | | | | |
|---|---|---|---|---|
| 4,226,491 A | * | 10/1980 | Kazama et al. | 339/17 |
| 5,242,310 A | * | 9/1993 | Leung | 439/76 |
| 5,333,100 A | * | 7/1994 | Anhalt et al. | 361/818 |
| 5,339,222 A | * | 8/1994 | Simmons et al. | 361/818 |
| 5,373,149 A | * | 12/1994 | Rasmussen | 235/492 |
| 5,510,959 A | * | 4/1996 | Derstine et al. | 361/816 |
| 5,563,769 A | * | 10/1996 | MacGregor | 361/737 |
| 5,780,365 A | * | 7/1998 | Nogami | 439/76.1 |
| 5,896,274 A | * | 4/1999 | Ishida | 361/737 |
| 5,986,891 A | * | 11/1999 | Sugimoto | 361/737 |

FOREIGN PATENT DOCUMENTS

| | | | | |
|---|---|---|---|---|
| EP | 0 794 698 | * | 10/1997 | H05K/5/02 |
| JP | 5-185783 | | 7/1993 | |
| JP | 06-270578 | | 9/1994 | |
| JP | 07-49236 | | 5/1995 | |
| JP | 9-315062 | | 5/1997 | |
| JP | 9-505425 | | 5/1997 | |
| JP | 09153121 | * | 6/1997 | G06K/19/00 |
| JP | 9-153121 | | 6/1997 | |
| JP | 09-153121 | | 6/1997 | |
| JP | 9-164791 | | 6/1997 | |
| JP | 09-305733 | | 11/1997 | |
| JP | 10-166768 | | 6/1998 | |

* cited by examiner

*Primary Examiner*—Thien M. Le
*Assistant Examiner*—Daniel A. Hess
(74) *Attorney, Agent, or Firm*—Rader, Fishman & Grauer PLLC (57) ABSTRACT

A PC card frame kit is provided which comprises: a frame for retaining a board assembly having a connector mounted on a board; and a pair of panels for covering upper and lower faces of the board assembly mounted in the frame. The pair of panels each have a pivotal engagement piece provided on a rear edge thereof for pivotal engagement with the frame, front lock engagement pieces provided on front ends of opposite side edges thereof for lock engagement between the panels, and a press-fit piece provided on at least one of the side edges thereof to be press-fitted in the frame. The frame has a pivotal engagement piece receiving groove formed in a rear beam thereof for receiving the pivotal engagement piece in a rotatable manner, and a press-fit groove formed in at least one of opposite side beams associated with the press-fit piece for receiving the press-fit piece.

12 Claims, 9 Drawing Sheets

FRAME KIT FOR PC CARD, PC CARD, AND METHOD OF MANUFACTURING PC CARD

TECHNICAL FIELD

The present invention relates to a PC card frame kit, a PC card and a PC card production method. The term "PC card" is herein to be understood to include PC cards in a narrow sense, cards for communications such as memory cards and LAN cards, smart cards, small PC cards, CF (compact flash (trade mark)) cards, and other cards having constructions similar to the PC cards in a narrow sense.

BACKGROUND ART

Notebook personal computers, for example, are typically provided with a PC card slot, in which a PC card is fitted for extension of their capabilities. The PC card is of a card shape as a whole, and includes a board assembly having a connector mounted on a board for connection to the PC card slot, a frame retaining the board assembly, and a pair of metal panels covering upper and lower surfaces of the board assembly.

PC card production processes are generally classified into a mechanical production process which is suitable formass production and a manual production process which is suitable for relatively small volume production of various types of products. In the mechanical production process, metal panels are fixed to a frame such as molded from a resin with the use of a ultrasonic fusion bonding apparatus or the like. In the manual production process, on the contrary, a pair of metal panels are manually combined with each other by pressing the pair of metal panels toward each other by fingers or a jig with a board assembly and a frame held therebetween for assembling a PC card.

In a PC card frame kit (including the frame and the pair of metal panels) for use in the manual assembling process, for example, engagement members to be brought into lock engagement with each other are provided on side edges of the pair of metal panels. In the assembling, these engagement members are engaged with each other through through-holes formed in the frame, whereby the pair of metal panels are combined with each other and with the frame simultaneously.

However, this arrangement inevitably entails a loose connection between the metal panels and the frame. The loose connection practically presents no functional problem, but the PC card is mechanically unstable, thereby falling short of product perfection. In addition, the PC card may become disassembled if a great shock is applied thereto, for example, when the card is dropped on the floor.

One approach to solve this problem in the prior art is disclosed, for example, in Japanese Unexamined Patent Publication No. 9-153121 (1997). The prior art approach is intended to improve the mechanical stability of a PC card by resiliently biasing a pair of panels outward by resilient press members provided in a frame.

However, the prior art approach fails to assuredly prevent the disassembly of the PC card which may occur if a great shock is applied to the card, for example, when the card is dropped on the floor, because the looseness occurs within the range of resilient deformation of the resilient press members.

The panels, when pressed toward each other, are slightly deformed due to deformation of the resilient press members. Therefore, the PC card is not satisfactory in terms of product perfection.

The PC card is assembled by first positioning the pair of panels with respect to the frame and then combining the pair of panels with each other. However, the positioning of the panels with respect to the frame is not necessarily easy, resulting in difficulty in the assembling. This leads to a lower PC card assembling efficiency.

DISCLOSURE OF THE INVENTION

It is an object of the present invention to provide a PC card frame kit which provides a PC card free from any looseness, and to provide a PC card utilizing such a PC card frame kit.

It is another object of the invention to provide a PC card frame kit which provides a PC card having an improved resistance to an external force, and to provide a PC card utilizing such a PC card frame kit.

It is further another object of the invention to provide a production method for a PC card which ensures easy assembling of the PC card.

A PC card frame kit according to the present invention comprises: a frame for retaining a board assembly having a connector mounted on a board; and a pair of panels for covering upper and lower faces of the board assembly mounted in the frame, wherein the pair of panels each have a pivotal engagement piece provided on a rear edge thereof for pivotal engagement with the frame, front lock engagement pieces provided on front ends of opposite side edges thereof for lock engagement between the panels, and a press-fit piece provided on at least one of the side edges thereof to be press-fitted in the frame, wherein the frame has a pivotal engagement piece receiving groove formed in a rear beam thereof for receiving the pivotal engagement piece in a rotatable manner, and a press-fit groove formed in at least one of opposite side beams associated with the press-fit piece for receiving the press-fit piece.

With this inventive arrangement, the press-fit pieces of the panels are press-fitted in the press-fit groove of the frame, so that the loose connection between the pair of panels can be eliminated. Therefore, even if a great shock is applied to the PC card, for example, when the PC card is dropped on the floor, the PC card is prevented from becoming disassembled. Further, even if a torsion is applied to the PC card, the frame and the panels are accordingly deformed by the effect of the press-fit pieces and the press-fit groove, so that there is no possibility that the panels are disengaged from each other or from the frame. Thus, a PC card having a higher level of product perfection can be provided.

Since the panels are each combined with the frame by engaging the pivotal engagement piece with the pivotal engagement piece receiving groove and then rotating the panel with respect to the frame, the panels can easily be positioned with respect to the frame along the side edges of the panels. Further, the front lock engagement pieces are brought into lock engagement with each other, so that the panels are prevented from being disengaged from each other.

It is preferred that press-fit pieces are provided on both of the opposite side edges of each of the panels. Thus, the looseness can more assuredly be prevented.

The pivotal engagement piece preferably has an open square cross section perpendicular to the rear edge. Thus, the pivotal engagement piece can assuredly be connected to the frame, so that the disassembly of the PC card can be prevented.

A plurality of pivotal engagement piece receiving grooves may be provided in the rear beam of the frame in such an arrangement that a space can be reserved in which the connector or the like is mounted.

The pivotal engagement piece receiving groove preferably has a positioning abutment portion which is to abut against the pivotal engagement piece for positioning the panels with respect to the frame along the rear edges of the pair of panels.

With this arrangement, the positioning of the panels with respect to the frame along the rear edges of the panels can easily be achieved. Thus, the assembling of the PC card is further facilitated.

The positioning abutment portion may be provided at an end of the pivotal engagement piece receiving groove to abut against a side face of the pivotal engagement piece.

The pair of panels preferably each further have a side lock piece provided on at least one of the opposite side edges thereof for lock engagement between the panels.

With this inventive arrangement, the side edges of the panels are connected by the lock engagement, so that the pair of panels can assuredly be combined with each other.

It is preferred that side lock pieces are provided on both of the opposite side edges of each of the panels. Thus, the panels are assuredly prevented from being disengaged from each other.

It is preferred that the side lock pieces respectively provided on the pair of panels are resilient pieces, one of which is formed with a hook portion for preventing disengagement, and the other of which is formed with an engagement hole for receiving the hook portion for snap engagement with the hook portion.

With this arrangement, the side lock pieces are resiliently engaged with each other, so that the snap engagement therebetween can easily be achieved and the hook portion in the snap engagement is assuredly prevented from being disengaged from the engagement hole. Thus, the panels can more assuredly be combined with each other.

Alternatively, the side lock piece provided on one of the pair of panels is preferably a resilient member having an upstanding portion extending upward from the side edge of the panel to fit along the side beam of the frame, and a hook portion extending from the upstanding portion inwardly of the frame. In this case, the side lock piece provided on the other panel is preferably a resilient member having a downstanding portion extending downward from the side edge of the panel to fit along the side beam of the frame, a guide portion extending obliquely from the downstanding portion inwardly of the frame for guiding the hook portion, and an engagement hole formed in a proximal portion of the guide portion. It is preferred that the hook portion is guided into the engagement hole by the guide portion to be brought into snap engagement with the engagement hole by pressing the pair of panels toward each other in an opposed relation.

With this arrangement, the side lock pieces respectively provided on the side edges of the pair of panels are configured as the resilient members. Therefore, the both of resilient members are deformed when the pair of panels are pressed toward each other and the hook portion provided on the one panel is guided by the guide portion provided on the other panel. More specifically, the upstanding portion of the side lock piece on the one panel is resiliently deformed outwardly of the frame, while the downstanding portion (and the guide portion) of the side lock piece of the other panel is resiliently deformed inwardly of the frame. When the hook portion reaches the engagement hole, the side lock pieces are restored into their original shapes, whereby the snap engagement between the hook portion and the engagement hole is achieved. Since the pair of side lock pieces are each resiliently deformed, the snap engagement can easily be achieved.

Once the pair of side lock pieces are engaged with each other, disengagement of the side lock pieces is not easy. Since the engagement of the resilient members is achieved by causing the resilient members to be resiliently deformed away from each other and then to be restored into their original shapes, the hook portion and the engagement hole are kept in firm lock engagement. For release from the lock engagement, it is necessary to resiliently deform the side lock pieces to bring the hook portion and the guide portion away from each other by applying a force to the side lock piece of the one panel outwardly from the inside of the frame while applying a force to the side lock piece of the other panel inwardly from the outside of the frame. With the pair of side lock pieces being engaged with each other, however, it is impossible to apply an external force to the hook portion outwardly of the frame from the outside of the frame. Further, the guide portion is located inwardly of the junction between the pair of side lock pieces, so that it is impossible to apply an external force to the guide portion. With this inventive arrangement, therefore, the pair of panels can be combined with each other in a non-disassemblable manner, so that there is no possibility that the PC card thus assembled by combining the pair of panels becomes disassembled.

Alternatively, one of the pair of panels preferably has upstanding portions extending upward from generally entire portions of the opposite side edges thereof, and first abutment portions extending from generally entire distal edges of the upstanding portions bent inwardly of the frame. In this case, the other panel preferably has downstanding portions extending downward from generally entire portions of the opposite side edges of the panel, and second abutment portions extending from generally entire distal edges of the downstanding portions bent inwardly of the frame to be opposed to the first abutment portions. It is preferred that the first abutment portions respectively abut against the second abutment portions with the pair of panels combined with each other.

With this arrangement, the pair of panels respectively have the first abutment portions and the second abutment portions which bend and extend inwardly of the frame from the generally entire portions of the opposite side edges thereof. With the pair of panels combined with each other, therefore, generally entire edge faces of the opposite side edges of the pair of panels are directed inwardly of the frame, and the first abutment portions and the second abutment portions abut against, so that these end faces are not exposed to the outside. Thus, a PC card having a good appearance can be provided.

Where the aforesaid two features associated with the construction of the side edges of the panels are employed in combination, the panels may be configured such that: the upstanding portions extend from the generally entire portions of the opposite side edges of the one panel; the downstanding portions extend from the generally entire portions of the opposite side edges of the other panel; the hook portions extend from the distal edges of the first abutment portions; and the guide portions extend from the distal edges of the second abutment portions.

In this case, the hook portions are preferably each held between an edge face of the engagement hole and the second abutment portion with the pair of side lock pieces engaged with each other. Thus, the second abutment portion resiliently abuts against the hook portion, whereby the looseness can be eliminated. The hook portion which is assuredly locked by the edge face of the engagement hole is assuredly prevented from being disengaged from the engagement hole.

Another PC card frame kit according to the present invention comprises: a frame for retaining a board assembly having a connector mounted on a board; and a pair of panels for covering upper and lower faces of the board assembly mounted in the frame, wherein the pair of panels each have a side lock piece provided on at least one of opposite side edges thereof for lock engagement between the panels, wherein the side lock piece provided on one of the pair of panels is a resilient member having an upstanding portion extending upward from the side edge of the panel to fit along a side beam of the frame, and a hook portion extending from the upstanding portion inwardly of the frame, wherein the side lock piece provided on the other panel is a resilient member having a downstanding portion extending downward from the side edge of the panel to fit along the side beam of the frame, a guide portion extending obliquely from the downstanding portion inwardly of the frame for guiding the hook portion, and an engagement hole formed in a proximal portion of the guide portion, wherein the hook portion is guided into the engagement hole by the guide portion to be brought into snap engagement with the engagement hole by pressing the pair of panels toward each other in an opposed relation.

In accordance with the invention, a robust PC card can be provided which is easy to assemble and will never become disassembled after the assembling.

In this case, it is preferred that: the upstanding portion extends generally entirely along each of the opposite side edges of the one panel; the downstanding portion extends generally entirely along each of the opposite side edges of the other panel; the one panel further includes a first abutment portion extending from a generally entire distal edge of the upstanding portion inwardly of the frame to connect the upstanding portion to the hook portion; the other panel further includes a second abutment portion extending from a generally entire distal edge of the downstanding portion inwardly of the frame to connect the downstanding portion to the guide portion.

With this arrangement, a PC card having a good appearance can be provided.

In this case, the hook portion is preferably held between an edge face of the engagement hole and the second abutment portion with the pair of side lock pieces engaged with each other. Thus, the second abutment portion resiliently abuts against the hook portion, whereby the loose connection can be eliminated. The hook which is assuredly locked by the edge face of the engagement hole is assuredly prevented from being disengaged from the engagement hole.

The frame may be a unitary rectangular ring member having a generally rectangular shape. The term "rectangular ring member having a generally rectangular shape" herein means a closed ring frame having a generally rectangular shape including a square shape.

With this arrangement, the unitary frame is less liable to be deformed as compared with a case where the frame is composed of a plurality of separate members. Therefore, the assembled PC card is assuredly prevented from being loosened, and imparted with a higher resistance to an external force. In addition, when the panels are to be combined with the frame, the panels can easily be positioned with respect to the frame, so that the assembling of the PC card is advantageously facilitated.

A PC card according to the present invention comprises the aforesaid frame kit and a board assembly, wherein the pair of panels are combined with the frame with the board assembly retained between the pair of panels.

With this inventive arrangement, the panels are assuredly joined together in press-fit engagement against the frame, so that the panels can be combined with each other without any looseness and assuredly combined with the frame. Therefore, even if a great external force is applied to the PC card, for example, when the PC card is dropped on the floor or subjected to torsion, there is no possibility that the PC card becomes disassembled.

In accordance with the present invention, there is provided a PC card production method, in which a first panel and a second panel are attached to a frame retaining a board assembly having a connector mounted on a board to cover upper and lower faces of the board assembly mounted in the frame, the PC card production method comprising the steps of: bringing a pivotal engagement piece provided on a rear edge of the first panel into engagement with a pivotal engagement piece receiving groove formed in a rear beam of the frame; rotating the first panel with respect to the frame about the pivotal engagement piece as a rotation axis until a front edge of the first panel abuts against the frame; bringing a pivotal engagement piece provided on a rear edge of the second panel into engagement with the pivotal engagement piece receiving groove formed in the rear beam of the frame; rotating the second panel with respect to the frame about the pivotal engagement piece as a rotation axis until a front edge of the second panel abuts against the frame; and pressing the first and second panels against the frame to combine the first and second panels with each other and with the frame.

In accordance with the invention, the panels are combined with the frame after the pivotal engagement pieces are engaged with the pivotal engagement piece receiving groove of the frame and the panels are rotated about the pivotal engagement pieces as the rotation axes. Therefore, the panels can easily be positioned with respect to the frame along the side edges of the first and second panels.

Since the first and second panels are combined with each other and with the frame, the PC card thus produced has an improved resistance to an external force.

In this case, the combining step preferably comprises the steps of: engaging front lock engagement pieces provided on front end portions of opposite side edges of the first panel with front lock engagement pieces provided on front end portions of opposite side edges of the second panel; and press-fitting a press-fit piece provided on at least one of the side edges of each of the first and second panels into a press-fit groove formed in the frame.

Thus, the front lock engagement pieces are brought into lock engagement with each other, so that the PC card thus produced has the panels assuredly combined with each other.

Since the press-fit pieces of the respective panels are press-fitted in the press-fit groove of the frame, the PC card thus produced is free from any looseness, and has a higher resistance to an external force.

The press-fit pieces of the first and second panels may be press-fitted in the press-fit groove of the frame either simultaneously or successively.

The foregoing and other objects, features and effects of the present invention will become more apparent from the following description of the embodiments with reference to the attached drawings.

EMBODIMENTS OF THE INVENTION

Figure 1:
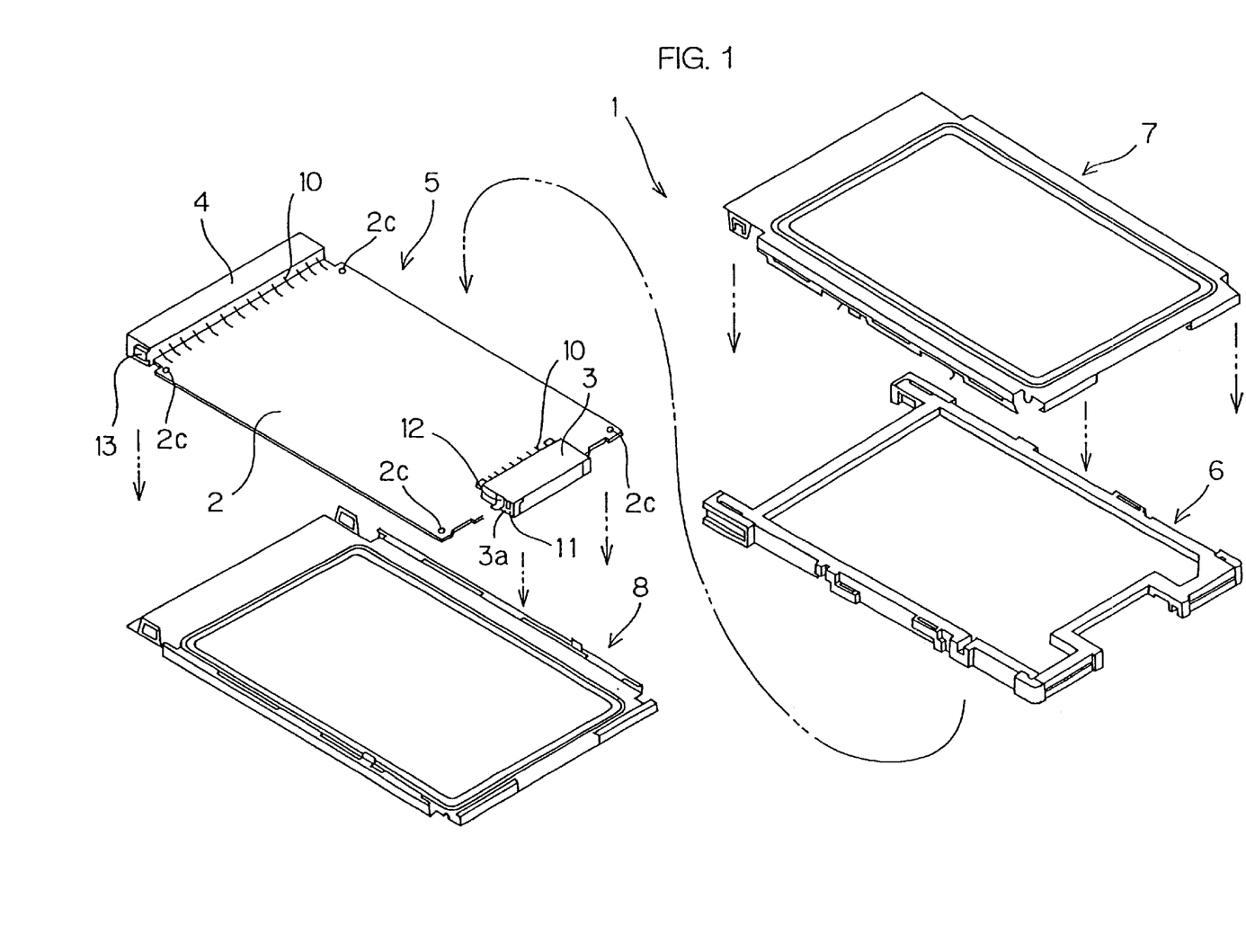
FIG. 1 is an exploded perspective view of a PC card according to one embodiment of the present invention.

FIG. 1 is an exploded perspective view illustrating the construction of a PC card 1 according to one embodiment of the present invention. Referring to FIG. 1, the PC card 1 includes a printed board 2, connectors 3, 4 mounted on the printed board 2, a frame 6 retaining a board assembly 5 having the first and second connectors 3, 4 mounted on front and rear edges of the printed board 2, and a pair of metal panels 7, 8 covering upper and lower faces of the board assembly 5 mounted in the frame 6.

The first connector 3 is used for electrical connection between the printed board 2 and an external connector (not shown), while the second connector 4 is used for electrical connection between a PC card slot (not shown) and the printed board 2. In the following explanation, the side of the second connector 4 to be connected to the PC card slot is regarded as the front side, and the side of the first connector 3 is regarded as the rear side.

The printed board 2 has a cutaway portion (not shown) provided in a rear edge thereof for receiving the first connector 3. Projections (not shown) provided on the first connector 3 are brought into engagement with a plurality of engagement holes (not shown) formed in the periphery of the cutaway portion, whereby the first connector 3 is properly positioned with respect to the printed board 2 when mounted on the printed board 2. Thereafter, a first engagement projection (not shown) extending from the first connector 3 is soldered to a predetermined portion adjacent to the rear edge of the printed board 2, whereby mechanical connection between the first connector 3 and the printed board 2 is achieved. The connectors 3 and 4 each have a plurality of contact leads 10, 10 extending forward and rearward. These contact leads are soldered onto the printed board 2. The mounting of the second connector 4 onto the printed board 2 is achieved by the soldering.

The first connector 3 has a pair of first projections 11 and a pair of second projections 12 which are provided on side faces thereof as extending laterally. Similarly, the second connector 4 has a pair of third projections 13 provided on side faces thereof. The printed board 2 has positioning holes 2c provided in four corners thereof for positioning thereof with respect to the frame 6.

Figure 2:
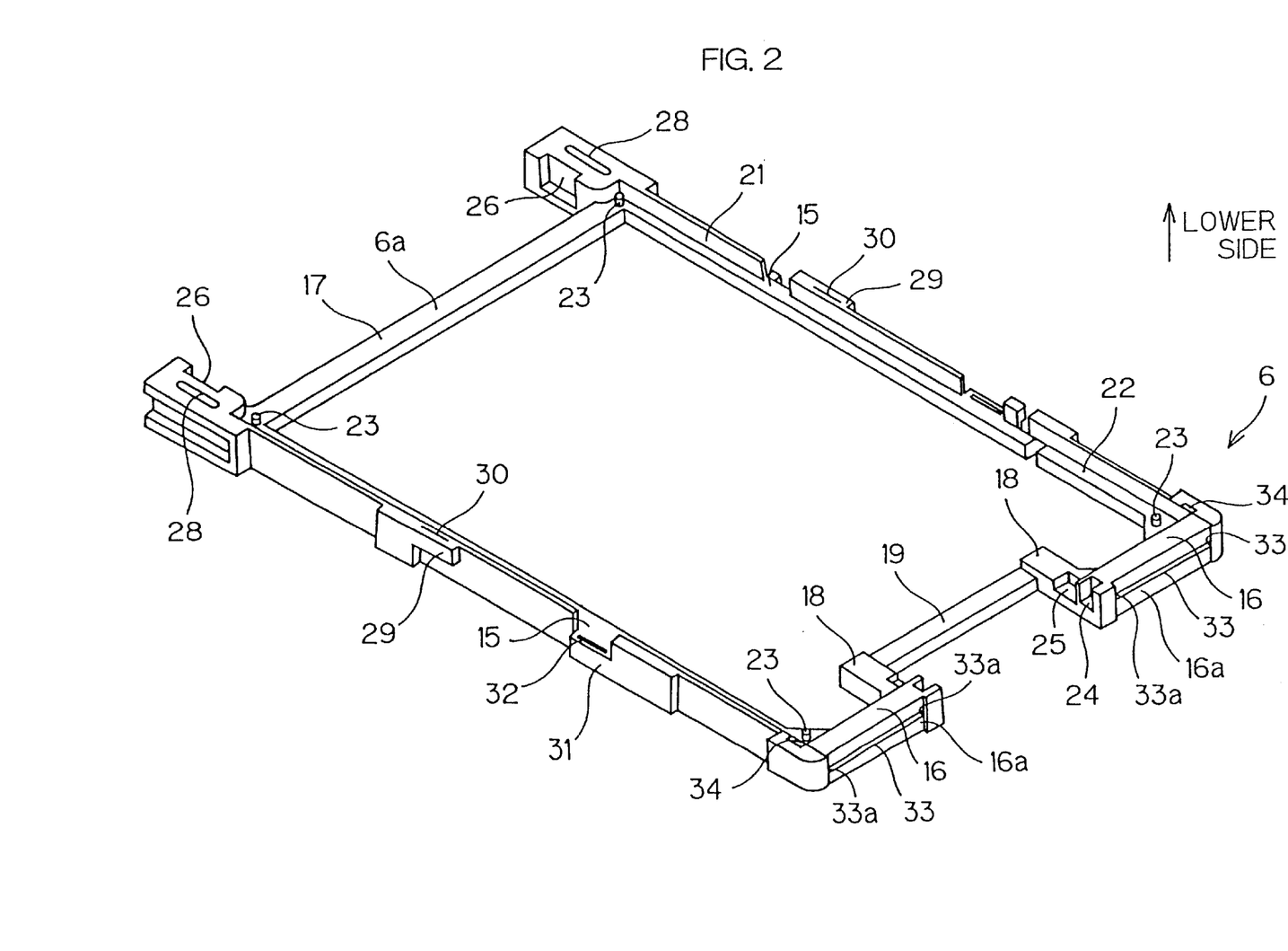
FIG. 2 is a perspective view illustrating a frame as seen from the back side thereof.

FIG. 2 is a perspective view illustrating the frame as seen from the back side thereof. The frame 6 is a rectangular ring frame unitarily injection-molded from a resin. The frame 6 includes a pair of side beams 15, 15, a pair of rear beams 16, 16 respectively extending inwardly from rear ends of the side beams 15, 15, and a front beam 17 connecting each of the side edges 16, 16 slightly rearward of front ends thereof.

The frame 6 further includes a pair of retention beams 18, 18 extending from inward ends of the pair of rear beams 16, 16 parallel to the side beams 15 for retaining side portions 3a of the first connector 3 (see FIG. 1) when the printed board 2 is accommodated in the frame 6, and a connection beam 19 connecting front ends of the pair of retention beams 18, 18 to define a space in which the first connector 3 is retained. These beams are integrally formed.

A step portion 21 for positioning the printed board 2 on a lower face 6a of the frame 6 is formed in inner surfaces of the side beams 15 and the rear beams 16. Positioning engagement pieces 23 to be inserted into the positioning holes 2c of the printed board 2 are provided upright on a lower step surface 22 of the step portion 21 in four corners of the frame. Lower faces of the front beam 17 and the retention beam 18 are flush with the lower step face 22 so as to abut against a peripheral edge of the upper face of the printed board 2.

The rear beams 16 respectively have first engagement recesses 24 formed in inward end faces thereof as opening downward (upward in FIG. 2) for retaining the first connector 3 in engagement with the first projections 11 of the first connector 3 (see FIG. 1). The retention beams 18 respectively have second engagement recesses 25 formed in inward faces thereof adjacent the first engagement recesses 24 for retaining the first connector 3 in engagement with the second projections 12 of the first connector 3 (see FIG. 1).

The side beams 15, 15 respectively have third engagement recesses 26, 26 formed in distal end portions thereof for retaining the second connectors 4 in engagement with the third projections 13 of the second connector 4 (see FIG. 1).

The side beams 15 further each have a through-channel 28 formed along the length thereof in a distal end portion thereof as extending therethrough from the upper face to the lower face of the frame 6. The through-channel 28 has a width which is twice as great as the thickness of front lock engagement pieces 50, 68 (see FIGS. 3 and 4) which will be described later. The side beams 15 further each have a fourth projection 29 provided forwardly adjacent the middle thereof as projecting outward from the lower face of the frame 6, and the fourth projection 29 is formed with a first press-fit groove 30 extending parallel to the side beam 15. The side beams 15 further each have a fifth projection 31 provided rearwardly adjacent the middle thereof as projecting outward from the upper face of the frame 6, and the fifth projection 31 is formed with a second press-fit groove 32 extending parallel to the side beam 15. The side beams 15 further each have a first engagement groove 34 and a second engagement groove 35 (see FIG. 7A) respectively formed along the length thereof in the lower and upper faces of a rear end portion thereof.

The rear beams 16, 16 respectively have pivotal engagement piece receiving grooves 33, 33 formed in outer side faces 16a, 16a thereof as extending longitudinally thereof. The pivotal engagement piece receiving grooves 33 each have a pair of abutment portions 33a, 33a provided at opposite ends thereof.

Figure 3:
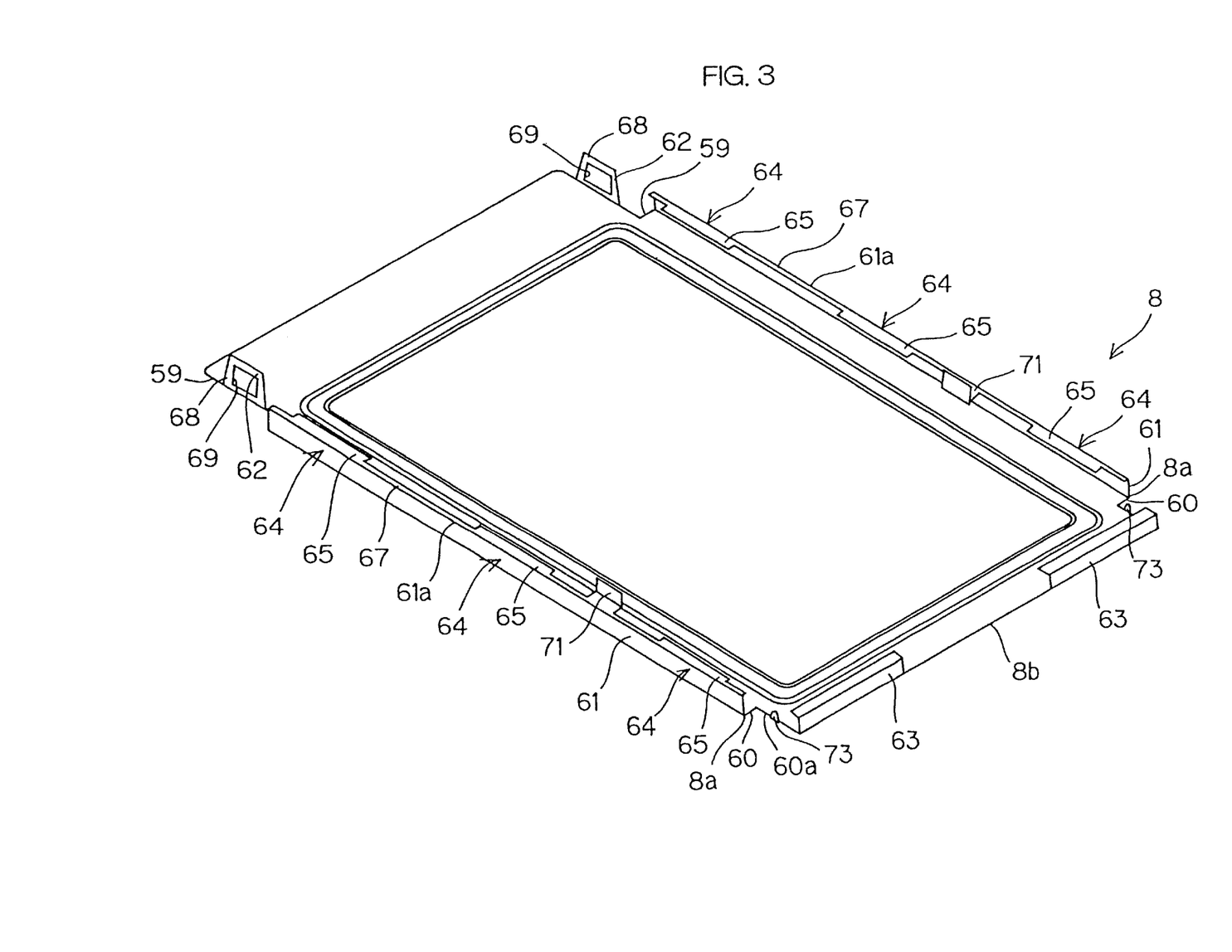
FIG. 3 is a perspective view illustrating the construction of a lower panel.
Figure 4:
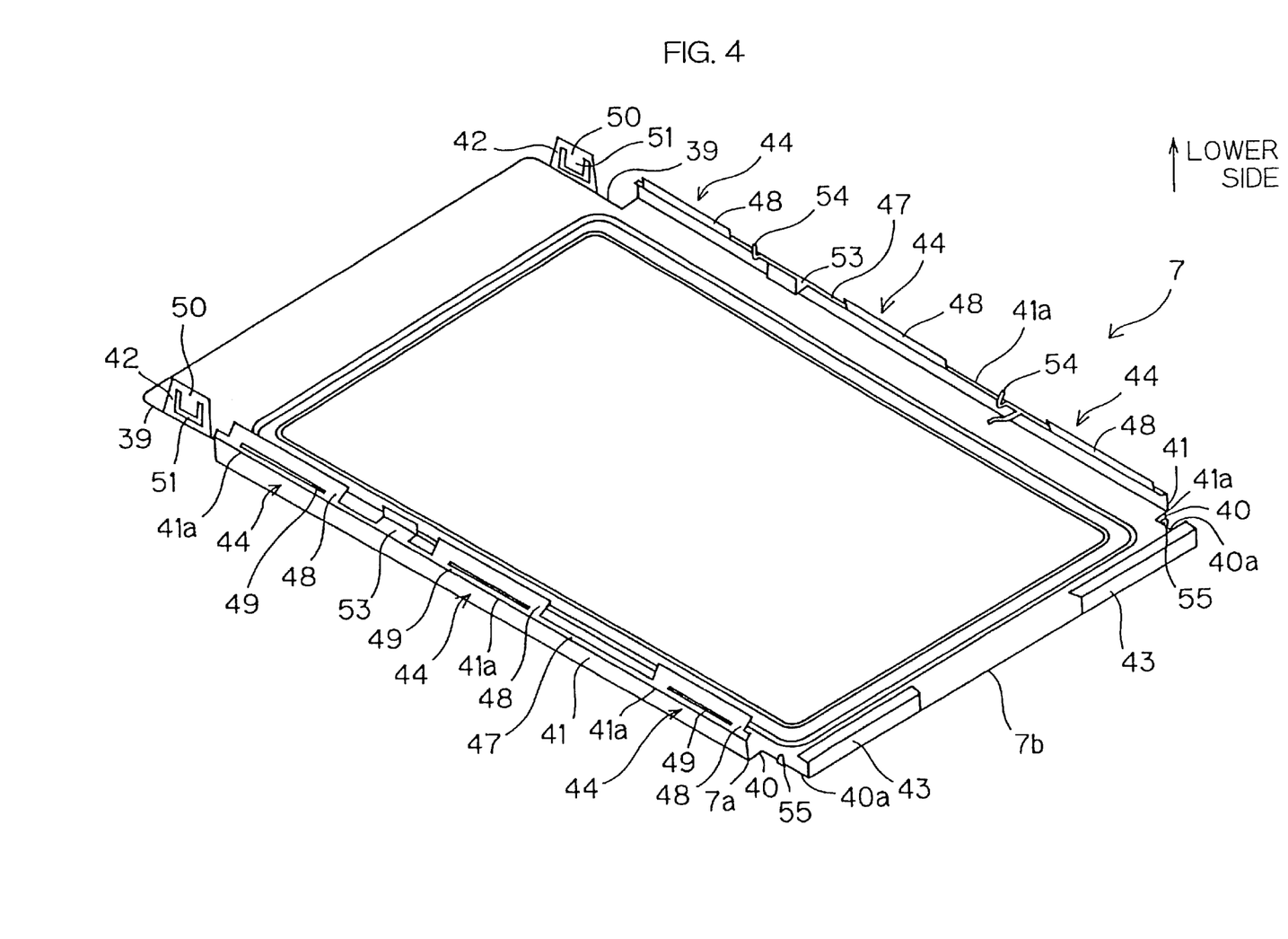
FIG. 4 is a perspective view illustrating an upper panel as seen from the back side thereof.

FIG. 3 is a perspective view illustrating a lower panel 8 of the pair of metal panels 7, 8 which is located on the lower side in a usual use state of the PC card 1, and FIG. 4 is a perspective view illustrating an upper panel 7 which is located on the upper side as seen from the back side thereof.

Referring to FIG. 3, the lower panel 8 is a conductive plate of a generally rectangular shape, and has front cutaway portions 59 and rear cutaway portions 60 located on four corners thereof for exposing the front and rear end portions of the side beams 15 of the frame 6 after the lower panel is combined with the frame 6.

The lower panel 8 has first upstanding portions 61 respectively extending upward from opposite side edges 8a, 8a thereof generally entirely along the side edges 8a, 8a to fit along the side beams 15 of the frame 6, and second upstanding portions 62 respectively extending upward bent at front end portions of the side edges 8a thereof. The lower panel 8 further has a pair of pivotal engagement pieces 63 of a generally open-square cross section extending upward from a rear edge 8b thereof to fit along the rear beams 16 of the frame 6 and bent inwardly. The pair of pivotal engagement pieces 63, 63 each have a predetermined width along the rear edge 8b.

Along the side edges 8a, first abutment portions 67 are respectively provided as extending from entire distal edges 61a of the first upstanding portions 61 bent inwardly of the frame 6. Three lower side lockpieces 64 are provided along each of the side edges 8a.

Lower front lock engagement pieces 68, 68 are respectively provided on the front end portions of the side edges 8a, 8a. The lower front lock engagement pieces 68 are each formed by forming a generally rectangular engagement hole 69 in a generally central portion of the second upstanding portion 62 which extends upright to fit along the side beam 15 of the frame 6.

A pair of second press-fit pieces 71, 71 to be respectively press-fitted in the second press-fit grooves 32 of the frame 6 are respectively provided rearwardly adjacent the midpoints of the side edges 8a, 8a. The second press-fit pieces 71 are configured to extend inwardly to fit along the side beams 15 of the frame 6 and be bent upwardly.

Second engagement pieces 73 are respectively provided on side edges 60a of the pair of rear cutaway portions 60 as extending upward to fit along the side beams 15 of the frame 6.

Referring to FIG. 4, the upper panel 7 is a conductive plate of a generally rectangular shape, and has front cutaway portions 39 and rear cutaway portions 40 located on four corners thereof for exposing the front and rear end portions of the side beams 15 of the frame 6 after the upper panel is combined with the frame 6.

The upper panel has pivotal engagement pieces 43 of a generally open-square cross section extending downward from a rear edge 7b thereof to fit along the rear beams 16 of the frame 6 and bent inwardly. The pair of pivotal engagement pieces 43, 43 each have a predetermined width along the rear edge 7b.

The upper panel 7 has first downstanding portions 41 formed respectively to bend and extend downward from opposite side edges 7a, 7a thereof generally entirely along the side edges 7a to fit along the side beams 15 of the frame 6, and second downstanding portions 42 formed respectively to bend and extend downward from front end portions of the side edges 7a thereof. Along the side edges 7a, second abutment portions 47 are respectively provided as extending from entire distal edges 41a of the first downstanding portions 41 bent inwardly of the frame 6. Three upper side lock pieces 44 are provided in a spaced relation along each of the side edges 7a. Upper front lock engagement pieces 50 are respectively provided on the front end portions of the side edges 7a, 7a. The upper front side lock engagement pieces 50 each have a second downstanding portion 42 extending downward to fit along the side beam 15 of the frame 6, and an upwardly incised portion 51 formed by incising and outwardly raising a generally central portion of the second downstanding portion 42. The upper front lock engagement pieces 50 each have a length which is slightly greater than the length of the through-channel 28.

First press-fit pieces 53 to be respectively press-fitted in the first press-fit grooves 30 of the frame 6 are respectively provided rearwardly adjacent the midpoints of the side edges 7a, 7a. The first press-fit pieces 53 are configured to extend inwardly from the second abutment portions 47 to fit along the side beams 15 of the frame 6 and be bent downwardly.

Two generally chevron-shaped conductive pieces 54, 54 extend inwardly downward from an inner side edge of the second abutment portion 47 on one of the side edges 7a.

A pair of first engagement pieces 55, 55 are respectively provided on side edges 40a of the rear cutaway portions 40 as extending downward to fit along the side beams 15 of the frame 6.

Figures 5A, 5B:
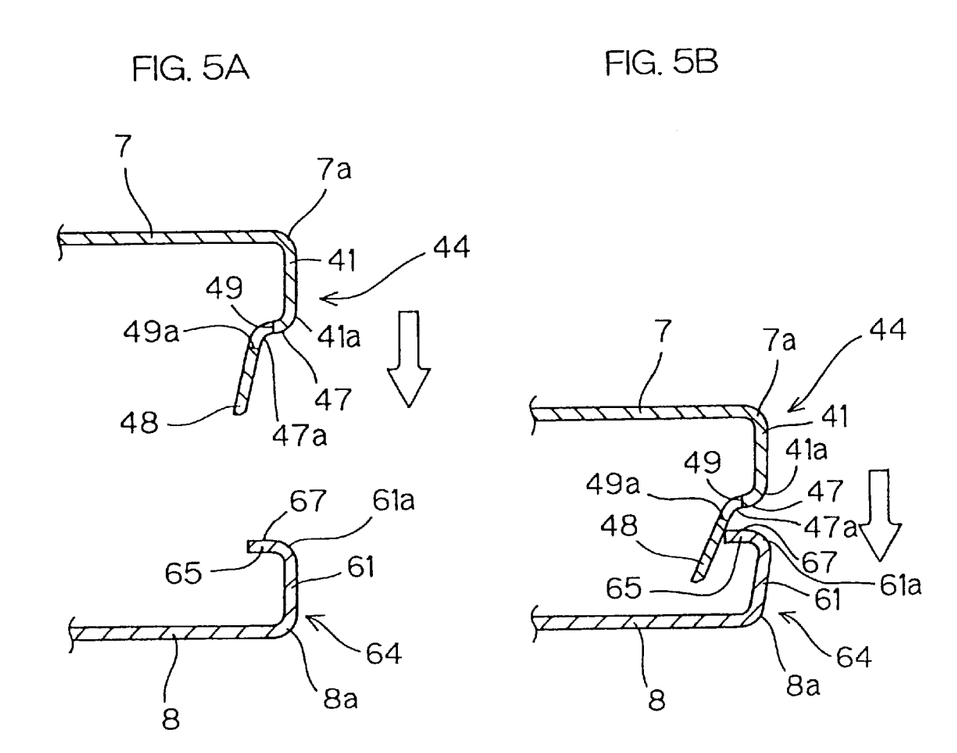
FIGS. 5A, 5B and 5C are major sectional views illustrating a process sequence for engaging an upper side lock piece with a lower side lock piece.
Figure 5C:
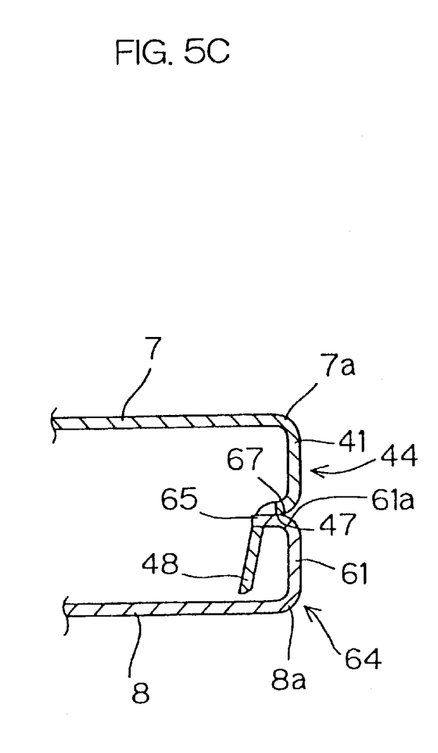

FIGS. 5A to 5C are major sectional views for explaining engagement of the upper side lock pieces 44 with the lower side lock pieces 64. Referring to FIG. 5A, the lower side lock pieces 64 each include the first upstanding portion 61, the first abutment portion 67 bending and extending inwardly from the distal edge 61a of the first upstanding portion 61, and a hook portion 65 extending from the first abutment portion 67, and serve as a resilient member as a whole.

On the other hand, the upper side lock pieces 44 each include the first downstanding portion 41, the second abutment portion 47 extending from the distal edge 41a of the first downstanding portion 41 bent inwardly of the frame 6, a guide portion 48 extending obliquely from the distal edge 47a of the second abutment portion 47 inwardly of the frame 6 for guiding the hook portion 65, and an engagement hole 49 formed in a proximal portion of the guide portion 48, and serve as a resilient member as a whole.

When the metal panels 7 and 8 are brought into lock engagement with each other, the guide portion 48 guides the hook portion 65 into engagement with the engagement hole 49 as shown in FIG. 5B. At this time, the guide portion 48 and a portion of the first upstanding portion 61 of the lower panel 8 adjacent to the hook portion 65 are resiliently deformed outwardly of the frame 6, while the guide portion 48 and a portion of the upper panel 7 adjacent to the first downstanding portion 41 are resiliently deformed inwardly of the frame 6. When the inwardly extending hook portion 65 is thereafter fitted in the engagement hole 49 as shown in FIG. 5C, the first upstanding portion 61 of the lower panel 8 resiliently outwardly deformed and the first downstanding portion 41 and guide portion 48 of the upper panel 7 resiliently inwardly deformed are restored into their original shapes, so that the first abutment portion 67 and the second abutment portion 47 are brought into abutment against each other.

Thus, the first upstanding portion 61 is first resiliently deformed away from the first downstanding portion 41 and the guide portion 48, and then the resilient deformation is removed to bring the hook portion 65 into engagement with the engagement hole 49. Therefore, firm engagement between the hook portion 65 and the engagement hole 49 can be achieved. Once the upper and lower side lock pieces 44, 64 are engaged with each other, it is extremely difficult to bring the upper and lower side lock pieces 44, 64 out of engagement. This is one factor that imparts the PC card with a higher resistance to an external force. In addition, the hook portion 65 and the guide portion 48 extend inwardly of the frame 6 and, hence, it is difficult to apply a force to the hook portion 65 outwardly from the inside of the frame 6 or to apply a force to the guide portion 48 inwardly from the outside of the frame 6. Therefore, the disengagement of the hook portion 65 from the engagement hole 49, which requires both of these force applying operations, is achieved only with the use of a special tool or the like. Further, the junction between the hook portion 65 and the engagement hole 49 is located inwardly of exposed surfaces of the panels 7, 8 (i.e., the first upstanding portion 61 and the first downstanding portion 41), making it more difficult to bring the side lock pieces 44 and 64 out of lock engagement.

With the upper and lower side lock pieces 44, 64 kept in lock engagement, the hook portion 65 is held between the second abutment portion 47 and a lower edge 49a of the engagement hole 49. Therefore, the second abutment portion 47 resiliently abuts against the hook portion 65 thereby to prevent loose engagement therebetween. In addition, the engagement of the hook portion 65 with the lower edge 49a of the engagement hole 49 assuredly prevents the disengagement.

Figure 6:
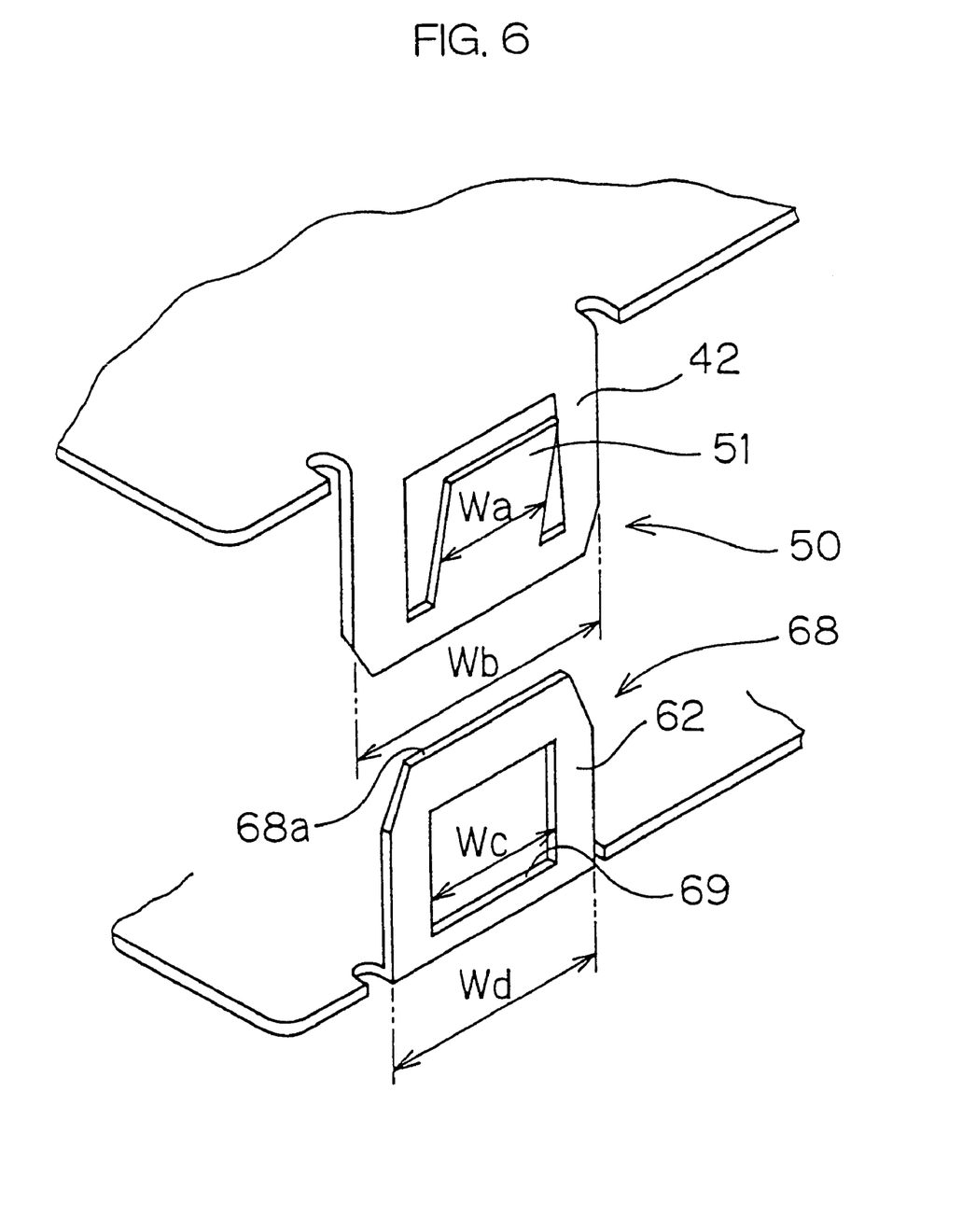
FIG. 6 is a major perspective view for explaining engagement of an upper front lock engagement piece with a lower front lock engagement piece.

FIG. 6 is a major perspective view for explaining engagement of the upper front lock engagement pieces 50 with the lower front lock engagement pieces 68. Referring to FIG. 6, the upper front lock engagement pieces 50 each have a length Wb which is slightly greater than the length Wd of the lower front lock engagement piece 68. Further, the length Wb of the upper front lock engagement piece 50 is slightly greater than the length of the through-channel 28, and the length Wd of the lower front lock engagement piece 68 is equal to the length of the through-channel 28. The incised portion 51 has a width Wa which is smaller than the width Wc of the engagement hole 69.

When the metal panels 7, 8 are combined with each other, an edge 68a of the lower front lock engagement piece 68 is guided to the incised portion 51 projecting outward. At this time, the incised portion 51 is resiliently deformed inward, while the lower front lock engagement piece 68 is resiliently deformed outward. When the incised portion 51 is thereafter fitted in the engagement hole 69, the incised portion 51 is restored into its undeformed state, and the lower front lock engagement piece 68 outwardly projects again. When the upper panel 7 is combined with the lower panel 8, the pair of the upper and lower metal panels 7, 8 are thus locked to each other with the incised portion 51 projecting outward in resilient engagement with the engagement hole 69.

With reference to FIGS. 7A to 7F, an explanation will next be given to a process for assembling the PC card 1.

Figure 7A:
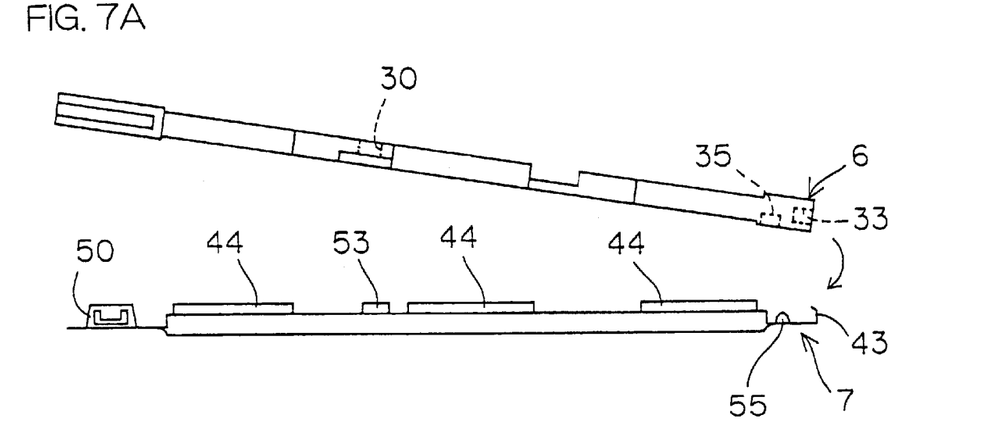
FIGS. 7A to 7F are schematic side views illustrating a process sequence for combining the upper and lower panels with the frame.
Figure 7B:
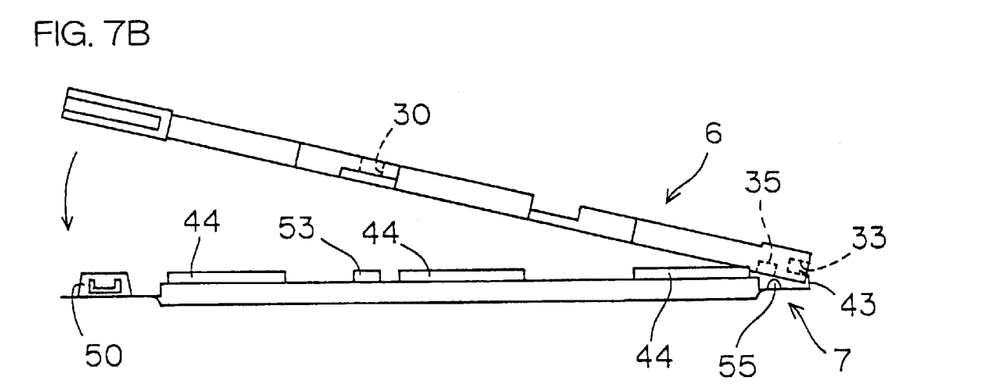

An operator first holds the upper panel 7 up side down by one of his hands and obliquely holds the frame 6 against the upper panel 7 by the other hand to bring the pair of pivotal engagement pieces 43, 43 provided on the rear edge 7b of the upper panel 7 in engagement with the pivotal engagement piece receiving grooves 33, 33 formed in the rear beams 16, 16 of the frame 6 (see FIGS. 7A and 7B) . Thus, the upper panel 7 is positioned with respect to the frame 6 along the side edges 7a of the upper panel 7. At the same time, the pivotal engagement pieces 43 abut against the positioning abutment portions 33a, 33a of the pivotal engagement piece receiving grooves 33, whereby the upper panel 7 is positioned with respect to the frame 6 along the rear edge 7b. Then, the operator rotates the frame 6 about the pivotal engagement piece receiving grooves 33, 33 as a rotation axis until the front edge of the frame 6 abuts against the upper panel 7 (see FIG. 7C).

Figure 7C:
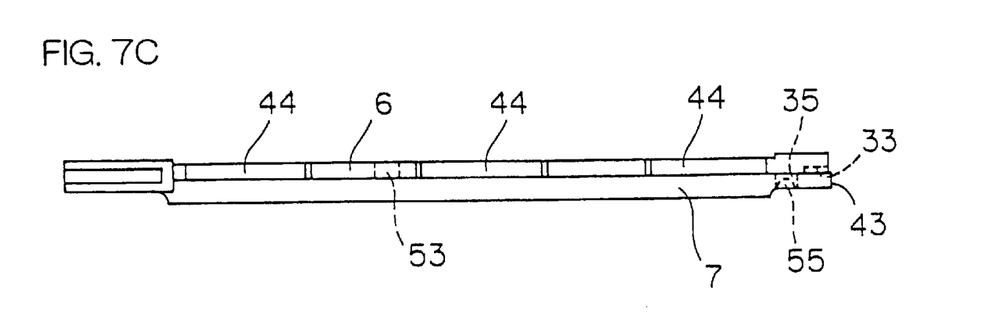

In the course of the rotation, the pair of first engagement pieces 55, 55 are respectively inserted into the pair of second engagement grooves 35, 35, whereby the frame 6 is guided to a proper position on the upper panel 7. The first engagement pieces 55, 55 respectively have arcuate guide surfaces which are opposed to the frame 6, and the guide surfaces respectively guide the first engagement pieces 55, 55 into the second engagement grooves 35, 35 for insertion. Thus, reliable positioning of the frame 6 with respect to the upper panel 7 is smoothly achieved at the initial stage of the rotation of the frame 6, thereby facilitating the subsequent operation for combining the frame 6 with the upper panel 7.

Then, the frame 6 is further rotated to press-fit the pair of press-fit pieces 53, 53 provided on the opposite side edges 7a, 7a of the upper panel 7 respectively into the pair of first press-fit grooves 30, 30. Further, the upper front lock engagement pieces 50 are respectively press-fitted into the through-channels 28. However, the press-fitting of the upper front lock engagement pieces 50 into the through-channels 28 may precede the press-fitting of the first press-fit pieces 53, 53 into the first press-fit grooves 30, 30. The upper side lock pieces 44 are located alongside the side beams 15 outwardly of the frame 6.

Subsequently, the positioning holes 2c of the printed board 2 are brought into engagement with the positioning engagement pieces 23 provided in the four corners of the frame 6, whereby the board assembly 5 is positioned on the lower face 6a of the frame 6.

Figure 7D:
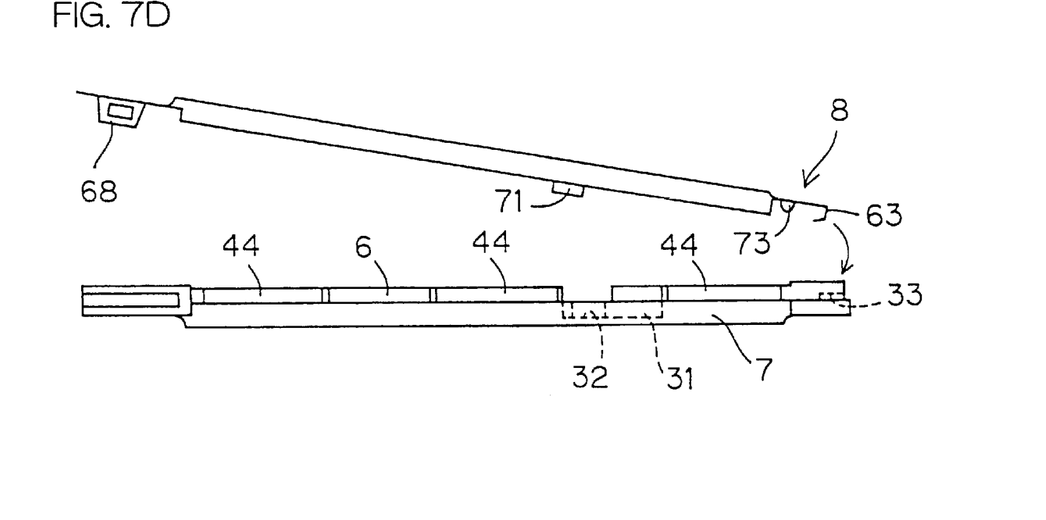
Figure 7E:
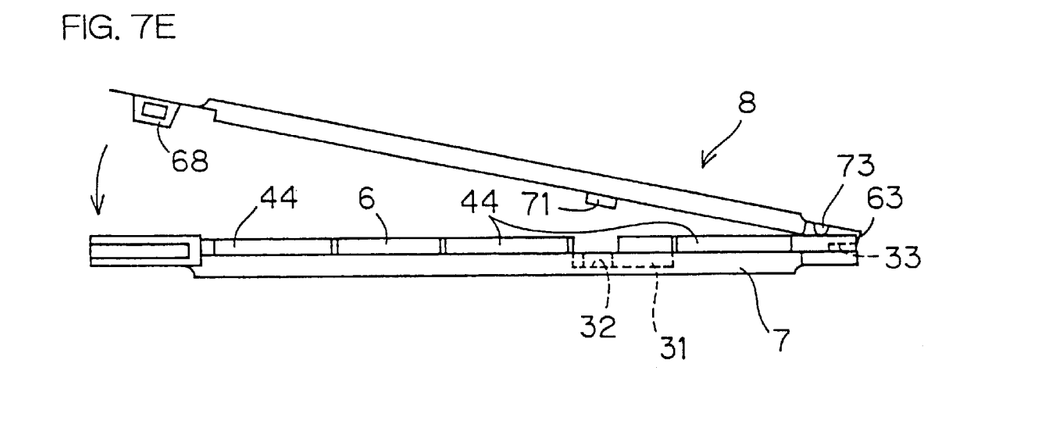

Thereafter, the operator obliquely holds the lower panel 8 against the frame 6, whereby the pair of pivotal engagement pieces 63, 63 provided on the opposite end portions of the rear edge 8b of the lower panel 8 are respectively engaged with the pair of pivotal engagement piece receiving grooves 33, 33 of the frame 6 combined with the upper panel 7 (see FIG. 7D). At this time, the pivotal engagement pieces 63, 63 are respectively fitted in spaces of the pivotal engagement piece receiving grooves 33, 33 not occupied by the pivotal engagement pieces 43, 43 of the upper panel 7 already engaged therewith (see FIG. 7E)

After the pivotal engagement pieces 63 are brought into abutment against the positioning abutment portions 33a, 33a of the pivotal engagement piece receiving grooves 33 thereby to properly position the lower panel 8 with respect to the frame 6 along the rear edge 8b, the operator rotates the lower panel 8 about the pivotal engagement pieces 63, 63 as a rotation axis until the front edge of the lower panel 8 abuts against the frame 6 (see FIG. 7F) At this time, the second engagement pieces 73, 73 which respectively have arcuate guide surfaces opposed to the frame 6 are operative in the same manner as the first engagement pieces 55, 55 of the upper panel 7, so that the lower panel 8 can properly and easily be positioned with respect to the lower panel 8 and combined therewith.

Figure 7F:
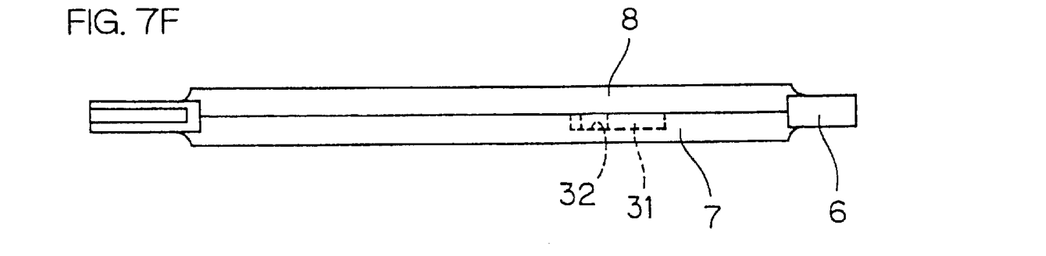

Then, the operator holds the upper and lower panels 7, 8 by his hands to press the lower panel 8 against the frame 6. Thus, the lower front lock engagement pieces 68 of the lower panel 8 are respectively inserted into the through-channels 28 which have smaller spaces with the upper front lock engagement pieces 50 already press-fitted therein, and engaged with the upper front lock engagement pieces 50. The pair of second press-fit pieces 71, 71 provided on the opposite side edges 8a, 8a of the lower panel 8 are respectively press-fitted into the corresponding pair of second press-fit grooves 32, 32. Further, the upper and lower side lock pieces 44, 64 are brought into lock engagement with each other. However, the insertion of the lower front lock pieces 68 into the through-channels 28, the press-fitting of the second press-fit pieces 71 into the second press-fit grooves 32 and the lock engagement of the upper and lower side lock pieces 44, 64, any one of which may precede the other, may be carried out in any order.

Since the length Wd of the lower front lock engagement pieces 68 is equal to the length of the through-channels 28 as described above, the lower front lock engagement pieces 68 are not press-fitted into the frame 6. As a result, the side lock pieces 44, 64 are snapped into engagement with each other with a sound when the lower panel 8 is pressed toward the frame 6. The snapping gives a good feeling when the panels 7, 8 are joined to each other.

With the upper and lower panels 7, 8 combined with the frame 6, the chevron-shaped conductive pieces 54, 54 of the upper panel 7 abut against the interior surface of the lower panel 8 opposed thereto, thereby establishing stable electrical conduction between the panels 7 and 8.

Thus, the connection between the metal panels 7, 8 and the frame 6 and the mechanical and electrical connection between the metal panels 7 and 8 are achieved.

The first and second engagement pieces 55 and 73 may be adapted to be respectively press-fitted into the corresponding second and first engagement grooves 35, 34. In this case, the torsion resistance of the PC card 1 can further be improved, so that the PC card 1 can assuredly be prevented from becoming disassembled.

In accordance with this embodiment, the press-fit pieces 53, 71 are respectively press-fitted in the press-fit grooves 30, 32 of the frame 6 to combine the metal panels 7, 8 with the frame 6 as described above. Therefore, the loose connection between the pair of metal panels 7 and 8 can be eliminated. Similarly, the press-fitting of the upper front lock engagement pieces 50 into the through-channels 28 can more assuredly prevent the loose connection between the metal panels 7 and 8. Thus, the PC card 1 is provided which is imparted with higher impact and torsion resistance and attains a higher level of product perfection.

Since the metal panels 7, 8 are combined with the frame 6 by engaging the pivotal engagement pieces 43, 63 with the pivotal engagement piece receiving grooves 33 of the frame 6 and then rotating the metal panels 7, 8 relative to the frame, the metal panels 7, 8 can easily be positioned with respect to the frame 6 along the side edges 7a, 8a. In addition, the positioning of the metal panels 7, 8 with respect to the frame 6 along the rear edges 7b, 8b can easily be achieved, because the pivotal engagement pieces 43, 63 abut against the positioning abutment portions 33a, 33a of the pivotal engagement piece receiving grooves 33. Further, the positioning abutment portions 33a, 33a are provided in the opposite ends of the respective pivotal engagement piece receiving grooves 33, so that the metal panels 7, 8 can assuredly be positioned with respect to the frame 6 along the rear edges 7b, 8b of the metal panels 7, 8.

Since the front lock engagement pieces 50 and the side lock pieces 44 are brought into lock engagement with the front lock engagement pieces 68 and the side lock pieces 64, respectively, the metal panels 7, 8 are prevented from being disengaged from each other.

Further, the side lock pieces 44, 64 are resiliently engaged with each other, so that the firm connection between the metal panels 7, 8 can be ensured after the snap engagement. Since the hook portions 65 are respectively brought into snap engagement with the engagement holes 49 formed in the proximal portions of the guide portions 48, the pair of metal panels 7, 8 are connected to each other without any clearance. As a result, the metal panels 7, 8 thus connected provide a good appearance. In addition, the second abutment portions 47 and the first abutment portions 67, which are provided generally entirely along the opposite side edges 7a, 8a of the respective metal panels 7, 8, abut against each other, so that edge faces of the metal panels 7, 8 are hardly seen from the outside of the finished PC card 1. Thus, the PC card has a further improved appearance.

Since the frame 6 is a unitary rectangular ring frame, the frame is less liable to be deformed by an external force. Therefore, a series of assembling steps including the positioning step for the engagement of the pivotal engagement pieces 43, 63 with the pivotal engagement piece receiving grooves 33 can easily be performed.

Figure 8:
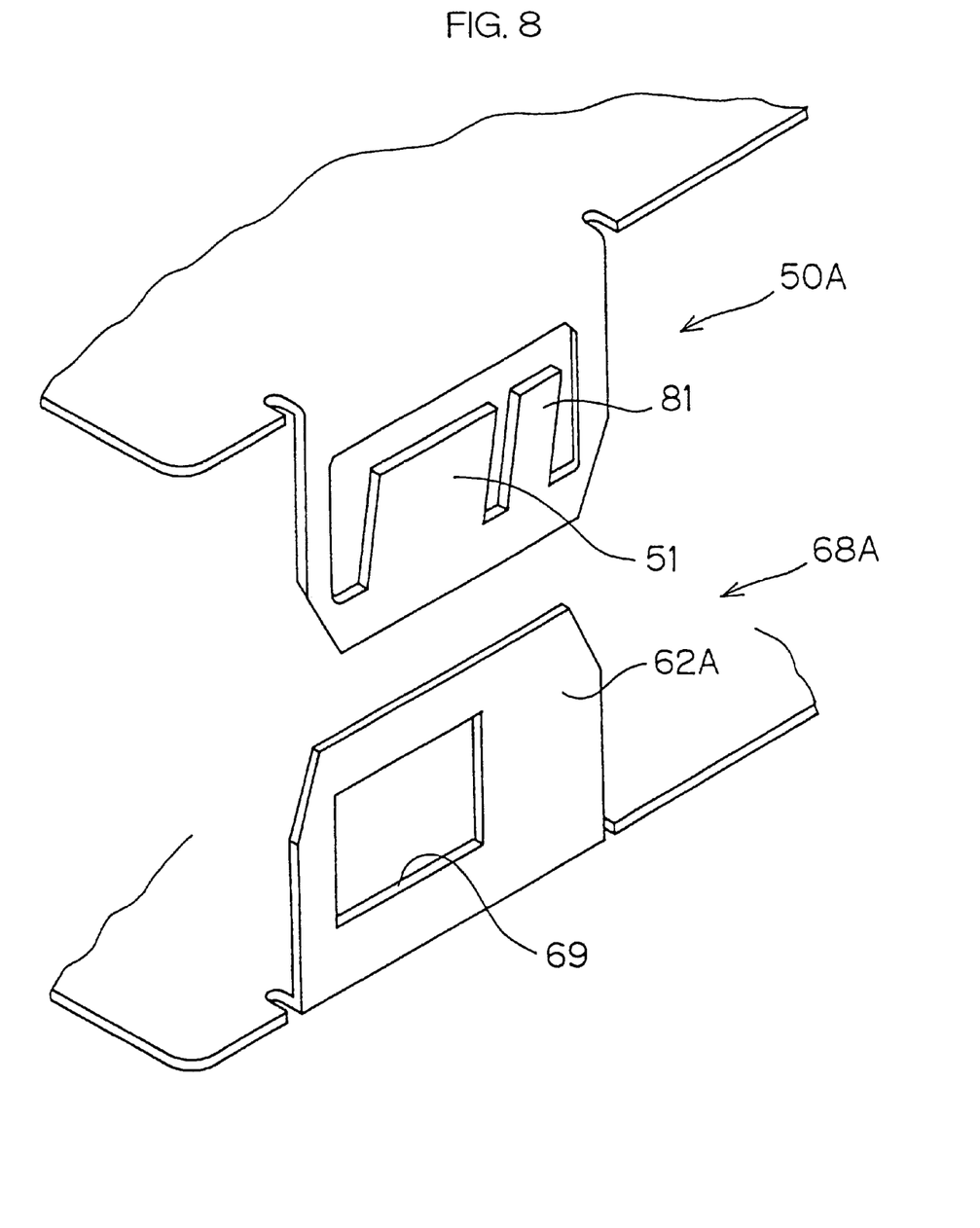
FIG. 8 is a major perspective view of a PC card according to another embodiment of the present invention.

FIG. 8 is a perspective view illustrating a pair of front lock engagement pieces according to another embodiment of the PC card 1 of the present invention. The pair of front lock engagement pieces 50A according to this embodiment are different from those of the embodiment shown in FIG. 6 in that conductive pieces 81 formed as directing downward by incising and outwardly raising the upper front lock pieces 50A are employed instead of the conductive pieces 54 as the conduction mechanism, and located rearwardly adjacent the incised portions 51 of the upper front lock engagement pieces 50A, and the second upstanding portions 62A of the lower front lock engagement pieces 68A extend to reach the conductive pieces 81 when the metal panels 7, 8 are combined with each other. In the embodiment shown in FIG. 8, the electrical connection between the metal panels 7 and 8 can more assuredly be established.

While the present invention has been described in detail by way of the embodiments thereof, it should be understood that the foregoing disclosure is merely illustrative of the technical principles of the present invention but not limitative of the same. The spirit and scope of the present invention are to be limited only by the appended claims.

This application claims priority benefits under the Treaty on the basis of Japanese Patent Application No. 10-103212 filed to the Japanese Patent Office on Apr. 14, 1998, the disclosure thereof being incorporated herein by reference.

What is claimed is:

1. A PC card frame kit comprising:
    a frame for retaining a board assembly having a connector mounted on a board; and
    a pair of panels for covering upper and lower faces of the board assembly mounted in the frame,
    wherein the pair of panels each have a pivotal engagement piece provided on a rear edge thereof for pivotal engagement with the frame, front lock engagement pieces provided on front ends of opposite side edges thereof for lock engagement between the panels, and a press-fit piece provided on at least one of the side edges thereof to be press-fitted in the frame,
    wherein the frame has a pivotal engagement piece receiving groove formed in a rear beam thereof for receiving the pivotal engagement piece in a rotatable manner, and a press-fit groove formed in at least one of opposite side beams associated with the press-fit piece for receiving the press-fit piece.

2. A PC card frame kit as set forth in claim 1, wherein the pivotal engagement piece receiving groove has a positioning abutment portion which is to abut against the pivotal engagement piece for positioning the panels with respect to the frame along the rear edges of the pair of panels.

3. A PC card frame kit as set forth in claim 1, wherein the pair of panels each further have a side lock piece provided on at least one of the opposite side edges thereof for lock engagement between the panels.

4. A PC card frame kit as set forth in claim 3, wherein the side lock pieces respectively provided on the pair of panels are resilient pieces, one of which is formed with a hook portion for preventing disengagement and the other of which is formed with an engagement hole for receiving the hook portion for snap engagement with the hook portion.

5. A PC card frame kit as set forth in claim 3, wherein the side lock piece provided on one of the pair of panels is a resilient member having an upstanding portion extending upward from the side edge of the panel to fit along the side beam of the frame, and a hook portion extending from the upstanding portion inwardly of the frame, wherein the side lock piece provided on the other panel is a resilient member having a downstanding portion extending downward from the side edge of the panel to fit along the side beam of the frame, a guide portion extending obliquely from the downstanding portion inwardly of the frame for guiding the hook portion, and an engagement hole formed in a proximal portion of the guide portion, wherein the hook portion is guided into the engagement hole by the guide portion to be brought into snap engagement with the engagement hole by pressing the pair of panels toward each other in an opposed relation.

6. A PC card frame kit as set forth in claim 1, wherein one of the pair of panels has upstanding portions respectively extending upward from portions of the opposite side edges thereof, and first abutment portions respectively extending from distal edges of the upstanding portions bent toward the frame, wherein the other panel has downstanding portions respectively extending downward from portions of the opposite side edges of the panel, and second abutment portions respectively extending from distal edges of the downstanding portions bent toward the frame to be opposed to the first abutment portions, wherein the first abutment portions respectively abut against the second abutment portions with the pair of panels combined with each other.

7. A PC card frame kit as set forth in any of claim 1, wherein the frame is a unitary rectangular ring member having a generally rectangular shape.

8. A PC card comprising:

a frame kit as recited in any of claims 1; and a board assembly, wherein the pair of panels are combined with the frame with the board assembly retained between the pair of panels.

9. A PC card frame kit comprising:

a rectangularly-shaped frame for retaining a board assembly having a connector mounted on a board, the frame having a pair of opposing side beams extending parallel to each other; and a pair of panels for covering upper and lower faces of the board assembly mounted in the frame and the pair of side beams, wherein the pair of panels each have a side lock piece provided on at least one of the opposite side edges thereof for lock engagement between the panels, wherein the side lock piece provided on one of the pair of panels is a resilient member having an upstanding portion extending upward from the side edge of the panel to fit along a side beam of the frame, and a hook portion extending from the upstanding portion toward the side beam, wherein the side lock piece provided on the other panel is a resilient member having a downstanding portion extending downward from the side edge of the panel to fit along the side beam of the frame, a guide portion extending obliquely from the downstanding portion toward the side beam for guiding the hook portion, and an engagement hole formed in a proximal portion of the guide portion, wherein the hook portion is guided into the engagement hole by the guide portion to be brought into snap engagement with the engagement hole by pressing the pair of panels toward each other in an opposed relation.

10. A PC card frame kit as set forth in claim 7, wherein the upstanding portion extends substantially along each of the opposite side edges of the one panel, wherein the downstanding portion extends substantially along each of the opposite side edges of the other panel, wherein the one panel further includes a first abutment portion extending from a distal edge of the upstanding portion toward the frame to connect the upstanding portion with the hook portion, wherein the other panel further includes a second abutment portion extending from a distal edge of the downstanding portion toward the frame to connect the downstanding portion with the guide portion.

11. A PC card production method, in which a first panel and a second panel are attached to a frame retaining a board assembly having a connector mounted on a board to cover upper and lower faces of the board assembly mounted in the frame, the PC card production method comprising the steps of:

bringing a pivotal engagement piece provided on a rear edge of the first panel into engagement with a pivotal engagement piece receiving groove formed in a rear beam of the frame;

rotating the first panel with respect to the frame about the pivotal engagement piece thereof as a rotation axis until a front edge of the first panel abuts against the frame;

bringing a pivotal engagement piece provided on a rear edge of the second panel into engagement with the pivotal engagement piece receiving groove formed in the rear beam of the frame;

rotating the second panel with respect to the frame about the pivotal engagement piece thereof as a rotation axis until a front edge of the second panel abuts against the frame; and pressing the first and second panels against the frame to combine the first and second panels with each other and with the frame.

12. A PC card production method as set forth in claim 11, wherein the combining step comprises the steps of:

engaging front lock engagement pieces provided on front end portions of opposite side edges of the first panel with front lock engagement pieces provided on front end portions of opposite side edges of the second panel; and press-fitting a press-fit piece provided on at least one of the side edges of each of the first and second panels into a press-fit groove of the frame.

\* \* \* \* \*